United States Patent
Montagne et al.

(10) Patent No.: US 8,025,041 B2
(45) Date of Patent: Sep. 27, 2011

(54) METHOD OF REMOVING THE FUEL CONTAINED IN THE LUBRICATING OIL OF AN INTERNAL-COMBUSTION ENGINE AND ENGINE USING SAME

(75) Inventors: Xavier Montagne, Rueil Malmaison Cedex (FR); Nicolas Jeuland, Paris (FR)

(73) Assignee: Institut Francais du Petrole, Cedex (FR)

( * ) Notice: Subject to any disclaimer, the term of this patent is extended or adjusted under 35 U.S.C. 154(b) by 552 days.

(21) Appl. No.: 12/089,993

(22) PCT Filed: Oct. 11, 2006

(86) PCT No.: PCT/FR2006/002292
§ 371 (c)(1),
(2), (4) Date: Oct. 8, 2008

(87) PCT Pub. No.: WO2007/042675
PCT Pub. Date: Apr. 19, 2007

(65) Prior Publication Data
US 2009/0272359 A1    Nov. 5, 2009

(30) Foreign Application Priority Data
Oct. 11, 2005 (FR) .................................. 05 10403

(51) Int. Cl.
*F01M 5/00* (2006.01)

(52) U.S. Cl. .......................... 123/196 AB; 210/167.02

(58) Field of Classification Search ............ 123/196 AB, 123/543, 548, 549, 557, 572, 573; 210/167.02, 210/167.06; 184/6.22, 6.21
See application file for complete search history.

(56) References Cited

U.S. PATENT DOCUMENTS

| | | | | |
|---|---|---|---|---|
| 2,330,116 A * | 9/1943 | Evans | ...................... | 210/167.02 |
| 2,483,937 A * | 10/1949 | Rosenblum | ............... | 123/196 A |
| 3,473,629 A * | 10/1969 | Robinson et al. | ........... | 184/6.22 |
| 3,970,816 A * | 7/1976 | Hosokawa et al. | ........... | 219/205 |
| 4,458,642 A | 7/1984 | Okubo et al. | | |
| 6,053,143 A | 4/2000 | Taylor | | |
| 6,341,615 B1 * | 1/2002 | Zorich et al. | ..................... | 137/14 |

FOREIGN PATENT DOCUMENTS

FR        2 803 624        7/2001
JP        2002-266619      9/2002

* cited by examiner

*Primary Examiner* — Michael Cuff
*Assistant Examiner* — Hung Q Nguyen
(74) *Attorney, Agent, or Firm* — Antonelli, Terry, Stout & Kraus, LLP.

(57) ABSTRACT

The present invention relates to a method removing the fuel contained in the lubricating oil of an internal-combustion engine comprising an engine block with an air intake circuit for a fuel mixture, a burnt gas exhaust circuit, an oil sump and means for pumping the oil contained in the sump. According to the invention, the method consists in removing, after pumping the oil, the fuel diluted in the oil by heating intermittently the oil for a time ranging from $\frac{1}{100}$ second to 10 second, in order to obtain vaporization of the fuel diluted in the oil.

9 Claims, 1 Drawing Sheet

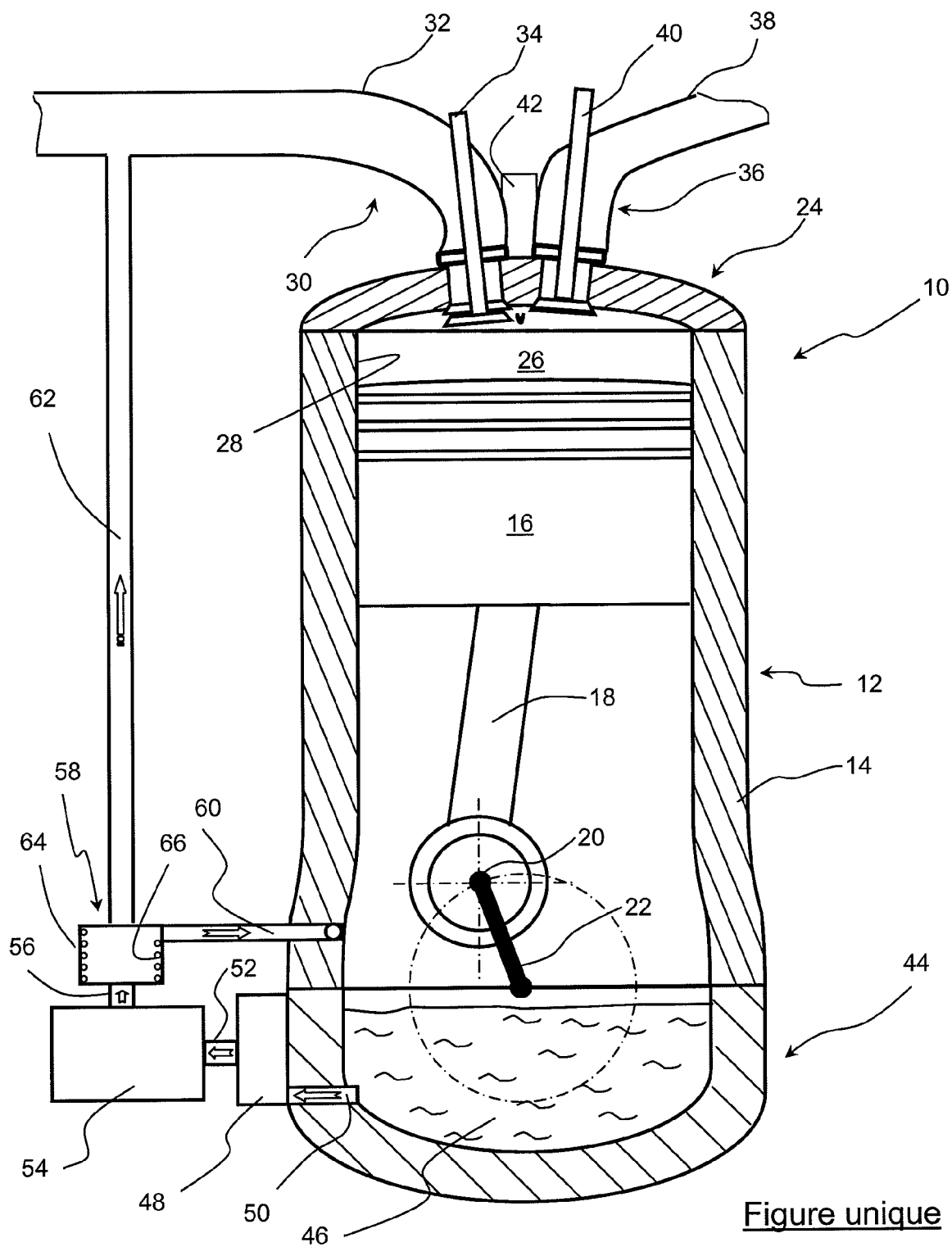
Figure unique

METHOD OF REMOVING THE FUEL CONTAINED IN THE LUBRICATING OIL OF AN INTERNAL-COMBUSTION ENGINE AND ENGINE USING SAME

FIELD OF THE INVENTION

The present invention relates to a method of removing the fuel contained in the lubricating oil of an internal-combustion engine and to an engine using same.

BACKGROUND OF THE INVENTION

As it is generally known, an internal-combustion engine comprises a closed lubrication circuit with an oil sump located in the lower part of the engine block, an oil pump for pumping the oil contained in this sump and passing it through an oil filter so as to free it of its impurities, and possibly through an oil radiator for cooling this filtered oil prior to feeding it back into the engine.

The main objective of lubricating oil is to facilitate the relative motion between two parts of the engine by minimizing or even preventing friction between these two parts. This oil therefore allows to create a viscous film that is interposed between these two parts so as to reduce or to prevent direct contact between the two surfaces of these parts.

This is notably the case for the piston of an engine that delimits, with the cylinder head and the cylinder, a combustion chamber wherein combustion of a fuel mixture occurs. This piston slides in the cylinder, with a rectilinear reciprocating motion, and a thin oil film must be continuously present between the outer surface of the piston and the wall of the cylinder. In the absence of this oil film, the motion of this piston undergoes a slowdown through friction in the cylinder, and the temperature of the piston and of the cylinder increases, which leads to a malfunction of this engine. This malfunction can lead to seizing of this piston, i.e. its sticking in the cylinder. Such seizure causes a sudden engine breakdown and requires a stage of reconditioning this engine, which is expensive.

This problem is all the more worrying since, for some types of diesel engines with combustion effluent post-treatment, the fuel injection strategies are such that part of the fuel injected is diluted in the oil film. In fact, during the engine running cycle, this fuel is fed into the combustion chamber in such a way that it is sprayed onto the oil film present on the major part of the axial area of the cylinder wall. This fuel mixes then by dilution with the oil of the film.

This oil containing diluted fuel then reaches the oil sump, generally through gravity under the effect of the scraper ring provided around the piston, from where it is pumped in order to be filtered and sent back towards parts to be lubricated, notably for creating the oil film between the piston and the cylinder. This film thus receives more fuel that is also diluted in the oil film. This oil with a still higher fuel dilution flows back into the oil sump where it is sucked by the pump for a new lubrication cycle.

Thus, after a certain number of lubrication cycles, the dilution ratio of the fuel in the oil is such that the oil film is impossible to obtain or it forms only locally between the piston and the cylinder, or it breaks upon motion of the piston. The two parts are therefore in direct contact, locally or totally, which slows down the motion of the piston through friction and increases its temperature, as well as that of the cylinder wall, eventually causing seizure of this piston.

The present invention aims to overcome the aforementioned drawbacks by means of a method allowing to remove the fuel present in the lubricating oil before it is fed back into the engine.

SUMMARY OF THE INVENTION

The present invention thus relates to a method for removing the fuel contained in the lubricating oil of an internal-combustion engine comprising an engine block with an air intake circuit for a fuel mixture, a burnt gas exhaust circuit, an oil sump and means for pumping the oil contained in the sump, characterized in that it consists in removing, after pumping the oil, the fuel diluted in the oil.

Advantageously, this method can consist in removing the fuel by separation from oil.

This method can consist in removing the fuel by heating the oil so as to obtain vaporization of the fuel contained in this oil.

Preferably, this method can consist in heating intermittently the oil.

The method can consist in heating the oil to a temperature of 150° C. to 350° C. for vaporization of the fuel.

This method can consist in heating the oil for a time ranging from $1/100$ second to 10 seconds.

Preferably, this method can consist in sending the treated fuel to the intake circuit of the engine.

It can also consist in sending the treated fuel to the exhaust circuit of the engine.

The invention also relates to an internal-combustion engine comprising an engine block with an air intake circuit for a fuel mixture, a burnt gas exhaust circuit, an oil sump and means for pumping the oil contained in the sump, characterized it comprises means for removing the fuel diluted in the oil.

Removal means can comprise means for heating the oil and preferably heating means by radiation.

Heating means can comprise infrared transmitters and/or microwave transmitters.

BRIEF DESCRIPTION OF THE FIGURE

Other features and advantages of the invention will be clear from reading the description hereafter, given by way of non limitative example, and with reference to the accompanying sole FIGURE that illustrates an internal-combustion engine using the method according to the invention.

DETAILED DESCRIPTION

The engine of this sole FIGURE comprises an engine block 10 with a cylinder block 12 comprising at least one cylinder 14 in which a piston 16 slides in a rectilinear reciprocating motion under the effect of a rod 18 connected to a crankpin 20 of a crankshaft 22. This cylinder block carries, in the upper part thereof, a cylinder head block 24 allowing to delimit a combustion chamber 26 between the upper part of the piston, the part of the cylinder head opposite the piston and wall 28 of cylinder 14.

As it is widely known, cylinder head 24 carries intake means 30 such as an intake pipe 32 whose opening into combustion chamber 26 is controlled by an intake valve 34. These intake means belong to an air intake circuit (not shown) of the engine that generally comprises an intake manifold connected to the intake pipes, an air intake line and possibly, upstream from the intake manifold, a means for compressing the air admitted, such as a turbocompressor. This cylinder head also carries burnt gas exhaust means 36 with an exhaust pipe 38 and an exhaust valve 40. These exhaust means also belong to a burnt gas exhaust circuit (not shown) that comprises an exhaust manifold connected to the exhaust pipes and an exhaust line that can comprise exhaust gas post-treatment means such as a catalyst. In the case of the sole FIGURE, which shows by way of example a direct-injection engine, the cylinder head also carries a fuel injection nozzle 42 allowing fuel to be fed into combustion chamber 26 in order to make a fuel mixture therein.

The lower part of the engine block comprises a housing 44 referred to as crankcase that partly houses crankshaft 22 and one function of which is to be used as a container for collecting engine lubricating oil 46.

This container carries an oil pump 48 with a suction line 50 that is plunged in the oil 46 present in housing 44 and a discharge line 52 connected to an oil filtering means 54 or oil filter. This oil filter can be associated with a device (not shown) for cooling this oil after filtration. Outlet 56 of this filter is connected to means 58 for removing the fuel contained in this oil. This removal is achieved by separating the fuel from the oil through a vaporization operation. These means 58 comprise a first outlet referred to as oil outlet 60 allowing to reintroduce the purified oil, i.e. fuel-free, filtered and possibly cooled into the engine block to provide lubrication of the various moving parts. Another outlet of means 58, referred to as fuel outlet 62, allows to either send the vaporized fuel to a fuel vapour treating and storage device, of canister type, or to reintroduce this treated fuel into the air intake circuit, such as intake pipe 32 (as illustrated in the FIGURE) or the intake manifold, or the intake line upstream from the turbocompressor.

Alternatively, the vaporized fuel can be fed into the exhaust circuit and more particularly into the exhaust line upstream from the exhaust gas post-treatment means.

By way of example, removal means 58 comprise a housing 64 including means 66 for heating the oil coming from the filter. These heating means allow discontinuous radiant heating of this oil for vaporizing the fuel contained therein. These heating means, such as infrared transmitters or microwave transmitters, allow to release a large amount of energy during a very short time, referred to as flash in the description hereafter. In fact, discontinuous energy supply allows to obtain high temperatures without excessive energy consumption. Furthermore, these radiant heating means allow to avoid contact between hot spots and the oil, which prevents oxidation thereof.

During field tests, the applicant assumed that the fuel-containing oil can be brought, upon each flash, to a temperature ranging between 150° C. and 350° C., preferably close to 320° C. for a diesel type engine. This temperature rise allows vaporization of the fuel diluted in this oil without altering the physico-chemical characteristics of this oil. The flash duration and the interval between the flashes are determined by the dilution ratio of the fuel in the oil and by the conditions used for treating the feed. Selection of the duration and of the flash frequency has thus allowed to determine the energy to be used and the mass of lubricant treated upon each flash. Advantageously, the flash duration ranges between $1/100$ second and 10 seconds, and the interval between flashes can be about 6 seconds and it can exceed 600 seconds.

Thus, from the example of an oil with a dilution ratio of 5 to 10% fuel in the oil, the table below gives the percentage of lubricant treated (treated feed %) in relation to the total amount of lubricant contained in the oil sump, the energy involved for various flash durations (0.01 second to 1 second) and the various intervals between flashes from 6 to 600 seconds.

| Flash duration | s | 0.01 | 0.1 | 1 |
| Treated feed % (/total feed) | % | 0.07 | 0.7 | 7 |
| Energy used | J | 2400 | 24000 | 240000 |
| Interval between flashes | s | 6 | 60 | 600 |

During operation, oil 46 in which fuel has been diluted is present in crankcase 44. This oil is sucked by pump 48 via suction pipe 50, then sent to filter 54 through discharge pipe 52. At the filter outlet, the oil enters the fuel removal means where it is heated to a temperature ranging between 150° C. and 350° C., preferably to 320° C. in the case of a diesel engine. This temperature is obtained by means of one or more energy flashes achieved by the radiant heating means (infrared transmitters or microwave transmitters) contained in these means of removal by separation. For example, these flashes last for a very short time of the order of $1/100$ second, with very short time intervals between each flash (about 6 seconds). This sudden and intermittent heating causes vaporization of the fuel contained in the oil, separation therefrom and discharge thereof in vapour form through outlet 62 of intake pipe 32. The fuel-free oil is then sent through outlet 60 to the engine block to provide continuity of the lubrication of the various moving parts of this engine.

Of course, without departing from the scope of the invention, the operation of vaporization of the fuel present in the oil using means of removal by separation can be either permanent for each engine running cycle and throughout the operating time thereof, or cyclic such as, for example, after a certain number of engine running hours and for a predetermined time period.

The present invention is not limited to the embodiment example given above and it encompasses any variant and equivalent.

Notably, one may consider cooling again the fuel-free oil at the removal means outlet and before it is fed into the engine block so that it reaches its operating temperature. One could also consider carrying out a single oil cooling operation, after removal of the fuel, without the oil cooling operation initially provided after filtration.

The invention claimed is:

1. A method for removing a fuel contained in a lubricating oil of an internal-combustion engine comprising an engine block with an air intake circuit for a fuel mixture, a burnt gas exhaust circuit, an oil sump and means for pumping the oil contained in the sump, the method comprising:
removing, after pumping the oil, the fuel diluted in the oil by heating intermittently the oil for a time ranging from $1/100$ second to 10 seconds, in order to obtain vaporization of the fuel diluted in the oil.

2. A method as claimed in claim 1, wherein the oil is heated to a temperature ranging from 150° C. to 350° C. in order to vaporize the fuel.

3. A method as claimed in claim 1, wherein the treated fuel is sent to the intake circuit of the engine.

4. A method as claimed in claim 1, wherein the treated fuel is sent to the exhaust circuit of the engine.

5. A method as claimed in claim 1, wherein only a purified oil is reintroduced back into the engine block of the internal-combustion engine.

6. An internal-combustion engine, the engine comprising:
an engine block with an air intake circuit for a fuel mixture;
a burnt gas exhaust circuit;
an oil sump; and
means for pumping an oil contained in the sump, wherein the means for pumping the oil further comprising:
means for removing a fuel diluted in the oil by heating intermittently the oil with means for heating the oil for a time ranging from $1/100$ second to 10 seconds in order to obtain vaporization of the fuel diluted in the oil.

7. An internal-combustion engine as claimed in claim 6, characterized in that the heating means comprise infrared transmitters.

8. An internal-combustion engine as claimed in claim 6, characterized in that the heating means comprise microwave transmitters.

9. An internal-combustion engine as claimed in claim 6, wherein only a purified oil is reintroduced back into the engine block of the internal-combustion engine.

* * * * *